United States Patent Office 3,515,235
Patented June 2, 1970

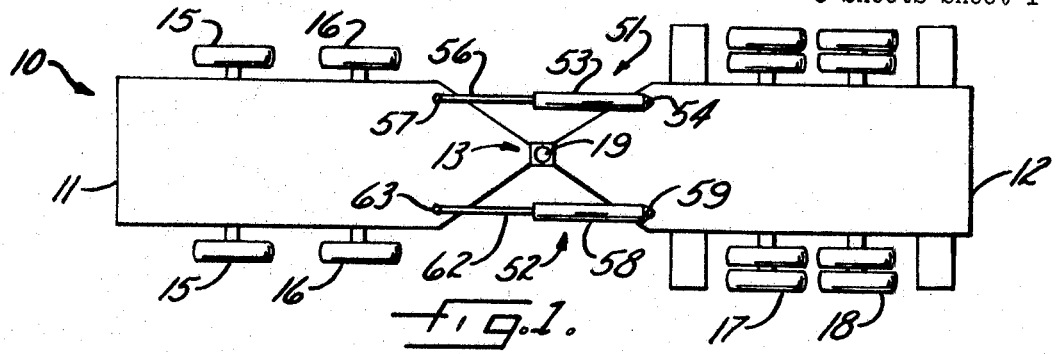
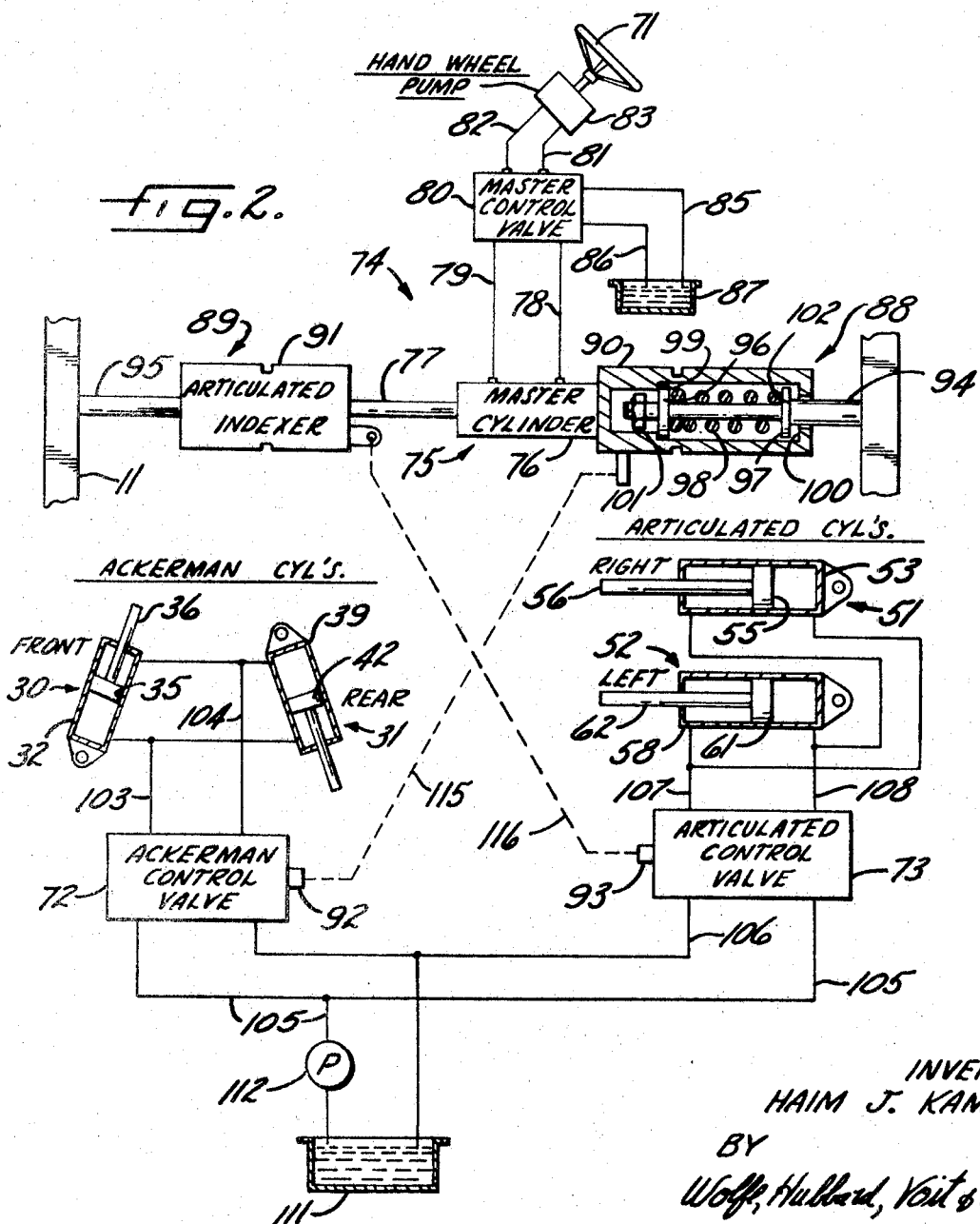

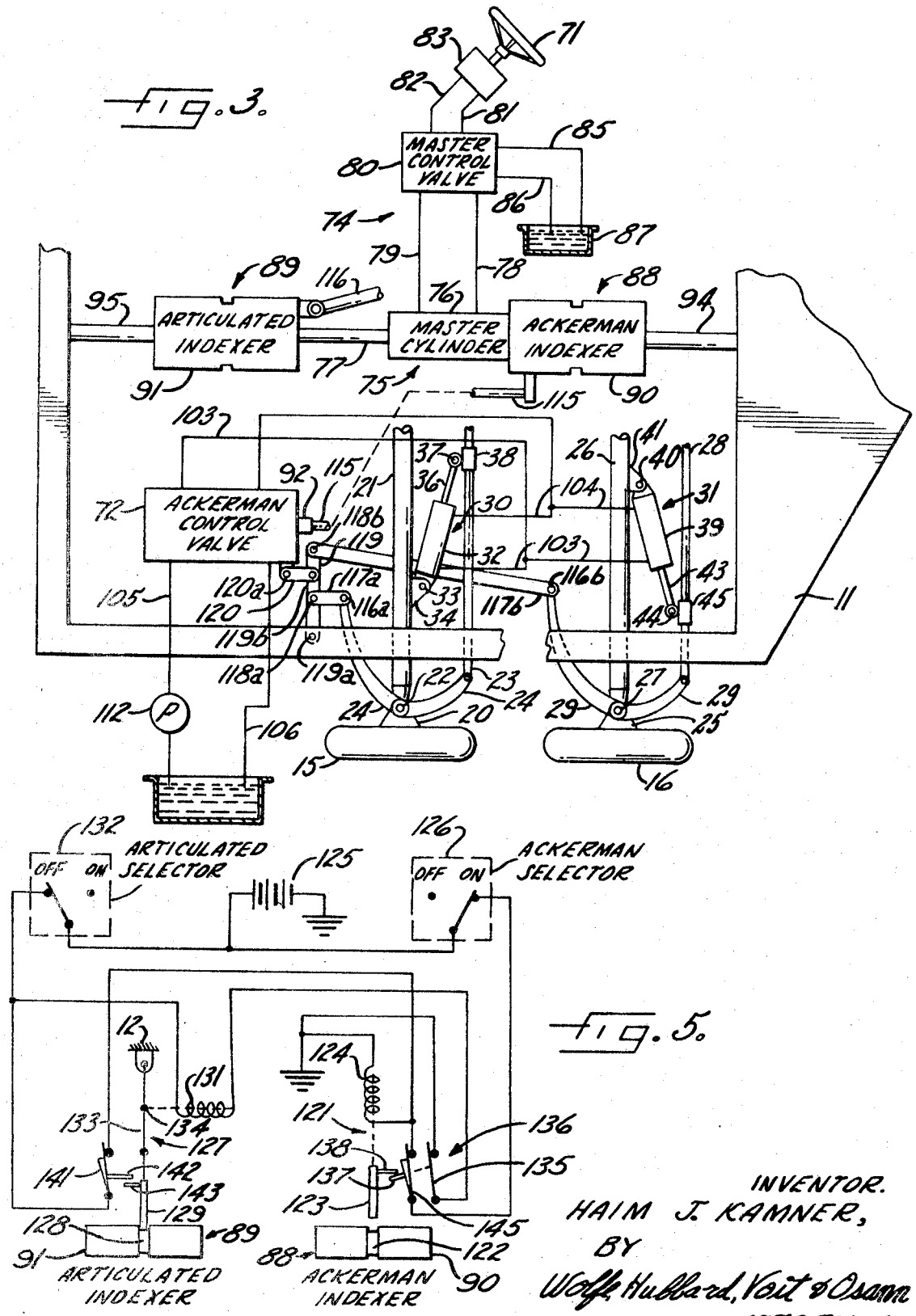

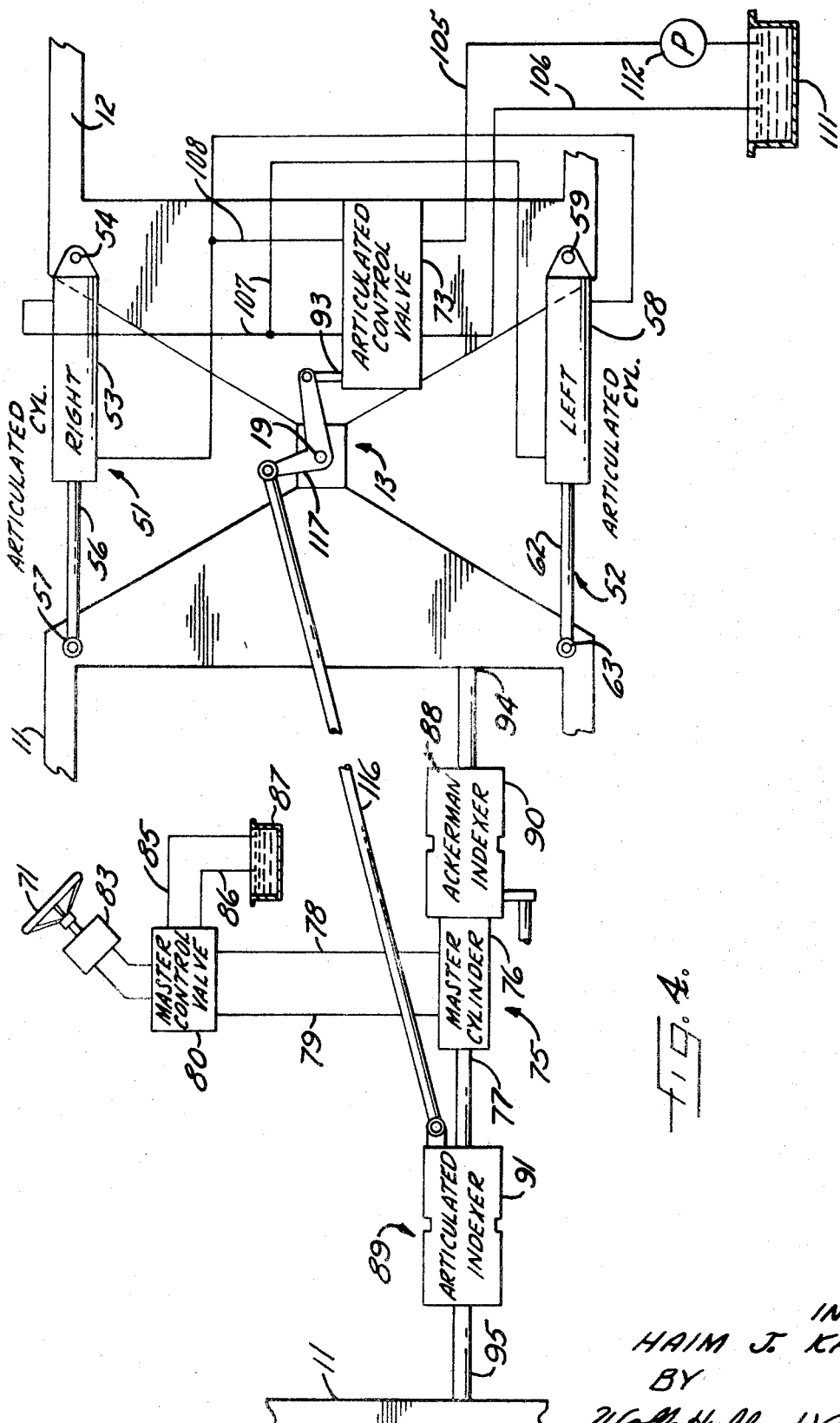

3,515,235
COMBINED ARTICULATED AND ACKERMAN
STEERING SYSTEM FOR VEHICLES
Haim J. Kamner, Lima, Ohio, assignor to Baldwin-Lima-Hamilton Corporation, Chicago, Ill., a corporation of Delaware
Filed Oct. 26, 1967, Ser. No. 678,223
Int. Cl. B62d 5/00
U.S. Cl. 180—79.2
14 Claims

ABSTRACT OF THE DISCLOSURE

A steering system for vehicles having pivotally interconnectected frames and at least one set of steerable wheels. The steering system includes Ackerman steering means connected to steer the steerable wheels and articulated steering means connected to pivot the frames. Both the Ackerman and articulated steering means are connected to be actuated through the operation of a single steering wheel, but provision is made to enable the operator to prevent actuation of either of these so that either Ackerman or articulated steering may be employed alone if desired. Sequencing means are connected between the steering wheel and the Ackerman and articulated steering means so that, when combined Ackerman and articulated steering is employed, the articulated steering means is actuated only after the Ackerman steering means has been fully actuated.

SUMMARY OF THE INVENTION

This invention relates in general to articulated vehicles and, more particularly, to steering systems for such vehilces.

A primary aim of the present invention is to provide a steering system incorporating both Ackerman and articulated type steering for vehicles having pivotally interconnected frames.

An object of this invention, in one of its aspects, is to provide a steering system of the foregoing type wherein the vehicle operator may select Ackerman steering alone, articulated steering alone, or combined Ackerman and articulated steering to suit the existing operating conditions and his personal preferences. A detailed related object is to provide a steering mode selector mechanism for such a steering system which is fail-safe to the extent that at least one of the steering modes is at all times operable despite error in operating the selector mechanism or failure of the selector mechanism itself.

Another object of the present invention, relating to the provision of combined Ackerman and articulated steering, is to provide a steering mode which may be utilized to obtain a smaller turning radius than is available with either Ackerman or articulated steering alone. A related object is to provide means for automatically sequencing the application of the Ackerman and articulated steering.

A general aim of the invention is to provide a steering system of the foregoing type which is safe in operation, and which may be readily installed on new and existing articulated vehicles of a wide variety of types and designs.

BRIEF DESCRIPTION OF THE DRAWINGS

Other objects and advantages of the present invention will be apparent upon reading the following detailed disclosure with reference to the attached drawings, in which:

FIG. 1 is a simplified top plan view of an articulated vehicle with which the steering system of the present invention may be employed;

FIG. 2 is a fragmentary schematic illustrating the combined Ackerman and articulated steering system of the present invention;

FIG. 3 is a fragmentary schematic showing the Ackerman steering portion of the steering system of FIG. 2 in more detail;

FIG. 4 is another fragmentary schematic illustrating the articulated steering portion of the steering system of FIG. 2 in greater detail; and FIG. 5 is a schematic diagram of a fall-safe steering mode selector mechanism which may be employed in the steering system of FIG. 2.

DETAILED DESCRIPTION OF THE ILLUSTRATED EMBODIMENT

While the invention will be described in connected with a particular embodiment, it will be understood that the intent is not to limit it to that embodiment. To the contrary, the intent is to cover all alternatives, modifications, and equivalents as may be included within the spirit and scope of the invention.

Turning now to the drawings and particularly to FIG. 1, there is illustrated an articulated crane, indicated generally by 10, as representative of a type of vehicle with which the present invention may be employed. The crane 10 has a first or front frame 11 which is pivotally connected to a second or truck frame 12 by a conventional coupling 13. In this instance, the front frame 11 is supported in a known manner by forward and rearward sets of steerable ground engaging wheels, 15 and 16, respectively. These wheels are preferably steered according to the well known Ackerman steering principle and, for this reason, the steering thereof will be hereinafter referred to as "Ackerman steering." The truck frame 12 is supported by forward and rearward sets of ground engaging wheels, 17 and 18, respectively, which are arranged in dual wheel assemblies and driven (by means not shown) to propel the crane.

In accordance with the present invention both Ackerman and articulated steering are provided for the crane 10. To this end, Ackerman steering means are provided to supply rotation of the steerable wheels 15 and 16 about their respective steering axis, and articulated steering means are provided to supply relative movement of the frames 11 and 12 about an articulated steering axis defined by the vertical pivot 19 of the coupling 13.

Referring to FIG. 3, the mounting of only one of each of the wheels 15 and 16 is illustrated, it being understood that the other wheel of each set is similarly mounted. As can be seen, the wheel 15 is journalled on a steering spindle 20 which, in turn, is pivotally mounted on one end of a laterally extending front axle 21 by a kingpin 22 and connected to an end of a forward tie rod 23 by a steering arm 24 in a conventional fashion. Similarly, the wheel 16 is journalled on a steering spindle 25 which, in turn, is pivotally mounted on one end of a laterally extending rear axle 26 by a kingpin 27 and connected to one end of a rearward tie rod 28 by a steering arm 29. As will be appreciated, the kingpins 22 and 27 define substantially vertical steering axes for the weels 15 and 16, respectively.

As shown in FIGS. 2 and 3, for steering the wheels 15 and 16, reversible motive means, in this instance a pair of hydraulic motors 30 and 31, are provided. The forward set of wheels 15 are steered by the motor 30 which has a double acting cylinder 32 pivotally connected at 33 to an anchor ear 34, a piston 35 which is slidable within the cylinder 32, and a piston rod 36 which has one end fixed to the piston 35 and its other end pivotally connected at 37 to a collar 38. The anchor ear 34 is fixed intermediate the ends of the front axle 21 and the collar 38 is fixed intermediate the ends of the forward tie rod 23. The rearward wheels 16 are steered by the motor 31 which has a doubleacting cylinder 39 pivotally connected at 40 to an anchor ear 41, a piston 42 which is slidable within the cylinder 39, and a piston rod 43 which is fixed at one end to the piston 42 and pivotally connected at its other end at 44 to a collar 45. Again, the anchor ear 41 is fixed intermediate the ends of the rear axle 26 and the collar 45 is fixed intermediate the ends of the rearward tie rod 28.

For articulated steering of the crane 10, a second reversible motive means is provided. In the illustrated embodiment, as best shown in FIGS. 2 and 4, this articulated steering motive means is a second pair of hydraulic motors 51 and 52 which are connected between the frames 11 and 12 on respective sides of the longitudinal axis of the crane. Specifically, the motor 51 is formed by a double acting cylinder 53 which is pivotally connected at 54 to the truck frame 12, a piston 55 which is slidable within the cylinder 53, and a piston rod 56 which is fixed at one end to the piston 55 and pivotally connected at its other end at 57 to the front frame 11. Similarly, the motor 52 is formed by a double acting cylinder 58 which is pivotally connected at 59 to the truck frame 12, a piston 61 which is slidable within the cylinder 58, and a piston rod 62 which has one end fixed to the piston 61 and its other end pivotally connected at 63 to the front frame 11.

In keeping with the present invention, the Ackerman and articulated steering motors 30, 31 and 51, 52, respectively, are both connected for actuation in response to the operation of a single operator controlled steering member, typically a steering wheel 71. To accomplish this in the illustrated embodiment, referring to FIG. 2, pressure fluid is selectively supplied and drained to and from the opposite ends of the Ackerman steering cylinders 32 and 39 and to and from the opposite ends of the articulated steering cylinders 53 and 58 by respective four-way control valves 72 and 73. The Ackerman and articulated steering control valves 72 and 73, respectively, are operated by a master steering control means, indicated generally at 74, which in turn is operated by the steering wheel 71.

As shown here, the response of the master control means 74 to operation of the steering wheel 71 is in the form of lengthwise variations of a link 75. Conveniently, the variable length link 75 may be formed by a double acting hydraulic cylinder 76, a piston (not shown) which is slidable within the cylinder 76, and a piston rod 77 which is fixed at its inner end to the piston in the usual manner. To readily distinguish the cylinder 76 from the Ackerman and articulated steering cylinders, it will sometimes be referred to hereinafter as the master cylinder.

For extending and retracting the piston rod 77 as the steering wheel 71 is turned, the head end and rod end of the master cylinder 76 are connected by hydraulic lines 78 and 79, respectively, to the output ports of a hydraulically operated master control valve 80. The control ports of the valve 80 are in turn connected through hydraulic lines 81 and 82, respectively, to opposite sides of a reversible hand pump 83 which is operated by the rotation of the steering wheel. Consequently, as the steering wheel 71 is turned, fluid is pumped from one end of the master cylinder 76 to the other by the pump 83 and through the valve 80.

To compensate for any volume differential which may exist between the opposite ends of the master cylinder 76, the input ports of the master control valve 80 are hydraulically connected by a supply line 85 and a drain line 86 to a reservoir 87. In the typical case, the rod end of the master cylinder 76 has a smaller volume than the head end. Thus, when the wheel 71 is turned to pump fluid from the rod end to the head end, additional fluid is drawn in through the supply line 85. Conversely, when the steering wheel 71 is turned to pump fluid in the opposite direction, excessive fluid is exhausted through the drain line 86.

For operating the Ackerman and articulated control valves, 72 and 73, respectively, the control means 74 further includes an Ackerman steering indexer 88 and an articulated steering indexer 89. These indexers have movable members 90 and 91, respectively, which are biased to normally centered positions and which are connected to the spools 92 and 93 of the valves 72 and 73, respectively, so that the valves are operated for a turn in one direction, say a right-hand turn when the steering wheel 71 is rotated clockwise to decrease the length of the link 75 and for a turn in the other direction, a left-hand turn, when the steering wheel is rotated counterclockwise to increase the length of link 75. To effectuate this in the illustrated embodiment, the movable members of the indexers, in this instance the housings 90 and 91, are axially translatable along respective guide rods 94 and 95 and are connected with the variable link 75 between spaced anchor points, typically spaced points on the front frame 11, by these guide rods. Specifically, the guide rod 94 of the Ackerman steering indexer is fixed to a point on the rearward end of the front frame and its housing 90 is fixed to the master cylinder 76. Similarly, the guide rod 95 of the articulated steering indexer is fixed to a point on the forward end of the front frame and its housing 91 is fixed to the piston rod 77.

As before mentioned, the indexer housings 90 and 91 are biased to respective normally centered positions. A variety of biasing arrangements of different types, such as spring, hydraulic, pneumatic, or the like, are suitable for this purpose. However, in the interest of completeness, a typical spring type biasing means is shown in FIG. 2 for the Ackerman steering indexer housing 90. As can be seen, the biasing means includes a pair of locating collars or washers 96 and 97 through which a reduced diameter portion of the guide rod 94 slidably passes and between which there is a precompressed spring 98. For centering the housing 90, the housing 90 is provided with a pair of substantially annular shoulders 99 and 100 against which the collars 96 and 97, respectively, are forced when the housing is in its centered position. Threaded on the guide rod 94 there is a nut 101. The nut 101 is adjusted so that, when the housing 90 is in its centered position, the collar 96 rests against the base of the nut while the collar 97 rests against an annular shoulder 102 provided by the larger diameter portion of the guide rod 94. Consequently, when the housing 90 is shifted from its centered position, the collars 96 and 97 are forced toward one another to further compress the spring 98.

Rotation of the steering wheel 71 operates the pump 83 to provide a pressure differential between the opposite ends of the cylinder 76. However, upon termination of this rotation, this pressure differential is eliminated and replaced by an oppositely directed recovery pressure differential caused by the biasing forces acting on the Ackerman and articulated steering indexer housings 90 and 91. Consequently, fluid flows from one end of the master cylinder 76 to the other until the housings 90 and 91 return to their respective centered positions to thereby terminate operation of the steering control valves 72 and 73 and eliminate this recovery pressure differential. Desirably, to provide positive reaction to the operation of the steering wheel 71, the biasing forces applied to the housings 90 and 91 are large enough that this action is substantially simultaneous.

In accordance with another important aspect of this invention, an aspect relating to the use of combined Ackerman and articulated steering, squencing means are provided to automatically sequence the actuation of the Ackerman and articulated steering motors 30, 31 and 51, 52 respectively. To maximize the steering stability and minimize the rate of tire wear, the sequencing provided is preferably such that the articulated steering motors 51 and 52 are actuated only for those turns which are too sharp for Ackerman steering alone. In this instance, this sequencing action is obtained by employing considerably stronger, say four times stronger, bias means for the articulated steering indexer 91 than for the Ackerman steering indexer 90 so that the articulated steering control valve 73 is operated only after the Ackerman steering motors 31 and 32 have been fully actuated. As an example of biasing for the Ackerman and articulated steering indexer housings which may be employed to provide both a rapid reaction to the operation of the steering wheel and sequencing of the foregoing type, a 74 pound bias may be applied to the Ackerman steering indexer housing 90 while a 244 pound bias is applied to the articulated steering indexer housing 91.

Turning now to the actuation of the Ackerman and articulated steering motors 30, 31 and 51, 52, respectively, pressure fluid is supplied and discharged to and from the opposite ends of the Ackerman steering cylinders 32 and 39 through hydraulic lines 103 and 104, and the Ackerman steering control valve 72 is operated to selectively connect the lines 103 and 104 to a supply line 105 and a return line 106. Similarly, pressure fluid is supplied and discharged to and from the opposite ends of the articulated steering cylinders 53 and 58 through hydraulic lines 107 and 108, and the articulated steering control valve 73 is operated to selectively connect the lines 107 and 108 to the supply line 105 and the return line 106. The supply line 105 is provided with pressure fluid from a reservoir 111 by a pump 112 and the return line 106 is connected to drain to the reservoir.

For operating the Ackerman steering control valve 72, the housing 90 of the Ackerman steering indexer 88 is connected, in this instance by an elbow link 115 (FIG. 3), to the valve spool 92. As a result, when the housing 90 is translated in one direction, say to the left, from its centered position, the spool 92 is shifted to the left thereby connecting the supply line 105 to the line 103 and the return line 106 to the line 104. The steering motion produced under these conditions provides a left-hand turn. Similarly, when the housing 90 is translated in the other direction, or to the right of its centered position, the spool 92 is shifted to the right thereby connecting the line 103 to the return line 106 and the line 104 to the supply line 105 for a right-hand turn.

For operating the articulated steering control valve 73, the housing 91 of the articulated steering indexer 89 is connected, in this instance by a tie rod 116 and bell crank 117 (FIG. 4), to the valve spool 93. Thus, when the housing 91 is translated to the right of its centered position, the valve spool 93 is shifted inwardly thereby connecting the supply line 105 to the line 107 and the return line 106 to the line 108 for a left-hand turn. On the other hand, when the housing 91 is translated to the left of its centered position, the valve spool 93 is shifted outwardly to connect the supply line 105 to the line 108 and the return line 106 to the line 107 for a right-hand turn.

To obtain responses of the Ackerman and articulated steering means which are proportional to the amount of rotation of the steering wheel 71, respective feedback systems are provided.

Referring to FIG. 3 and the feedback for the Ackerman steering, the steering arms 24 and 29 are pivotally connected at 116a and 116b to links 117a and 117b which, in turn, are pivotally connected at 118a and 118b, respectively, to a proportional lever arm 119. The lever arm 119 is pivotally connected at 119a to the frame 11 and at 119b to an arm 120 which is pivotally connected at 120a to the body of the Ackerman steering control valve 72. Proportional lever arm 119 serves the dual function of maintaining synchronism between the wheels 15 and 16 as they are turned and of shifting the body of the Ackerman steering control valve 72 to re-center the spool 92 when the wheels 15 and 16 have been rotated through the angle called for by the operation of the steering wheel 71.

The feedback for the articulated steering is accomplished through the relative movement of the frames 11 and 12 provided by actuation of the articulated steering motors 51 and 52. This movement acts through the tie rod 116 and bell crank 117 to re-center the spool 93 of the Ackerman steering control valve 73 when the angle between the center lines of the frames 11 and 12 is the angle called for by the operation of the steering wheel 71.

In accordance with another feature of the present invention, to enable the operator to select the steering mode to be employed to best suit the existing operating conditions and his personal preference, provision is made to enable him to select Ackerman steering alone, articulated steering alone, or combined Ackerman and articulated steering. Accordingly, a steering mode selector means such as illustrated in FIG. 5 is provided which, in this instance, is electrically operated, though it will be appreciated that it could also be hydraulically, pneumatically, or otherwise operated.

For articulated steering alone, the steering mode selector means includes an Ackerman steering lock-out mechanism, indicated generally at 121. As shown, the mechanism 121 includes a keyway or groove 122 which is formed in the Ackerman steering indexer housing 90 and a key or pin 123 which is aligned with the keyway 122 when the housing 90 is in its centered position. Means are provided to enable the operator to selectively insert and retract the key 123 in and from the keyway 122 to thereby selectively disable and enable the Ackerman steering. For this purpose, the key 123 is connected to a solenoid 124 which in turn is coupled across a supply source, suitably a battery 125, through an Ackerman steering selector switch 126. Accordingly, when the selector switch 126 is in the "ON" position, the solenoid 124 is energized to retract the key 123 and enable the Ackerman steering. On the other hand, when the selector switch 126 is in the "OFF" position, the solenoid 124 is de-energized and the key 123 is extended toward the housing 90. If the housing is in its centered position at this time, the key 123 is inserted in the keyway 122 thereby locking the housing 90 in its centered position to disable the Ackerman steering.

For Ackerman steering alone, the steering mode selector means further includes an articulated steering lock-out mechanism, indicated generally at 127. The lock-out mechanism 127 is in many respects similar to the lock-out mechanism 121. Thus, it includes a keyway 128 formed in the articulated steering indexer housing 91, a key 129 which is aligned with the keyway 128 when the housing 91 is in its centered position, a solenoid 131 which is connected to the key 129, and a selector switch 132 which is connected between the solenoid 131 and battery 125 and which is operable to selectively energize and de-energize the solenoid 131 to insert and retract the key 129 in and from the keyway 128 to thereby selectively enable and disable the articulated steering.

However, in carrying out this feature of the invention, means are provided to maintain one of the steering modes operative even if there should be a failure within the selector means or carelessness on the part of the operator. This in effect provides a fail-safe system.

In this instance, the articulated steering is maintained operative in the event of a failure within the selector means. To this end, the key 129 is connected to the solenoid 131 through a linkage 133 which has a pivot 134 which is biased off-center (by means not shown) so that the solenoid 131 must be energized to insert the key 129 in the keyway 128. This arrangement by itself provides for failure of the supply 125 or of the energization circuit for the solenoid 131. To provide for a failure within the energization circuit of the solenoid 124, included within the energization circuit for the solenoid 131 there is one blade 135 of a normally closed double pole switch 136. The switch 136 has an ear 137 which is disposed in the path of a trip arm 138 carried by the key 123 so that the switch 136 is opened when the key 123 is inserted in the keyway 122.

For maintaining steering control in the event of operator carelessness in setting the selector switches 126 and 132 to simultaneously disable the Ackerman and articulated steering systems, provision is made to override the setting of the selector switch 126 so that the Ackerman steering system is operative. This is accomplished by providing an auxiliary energization circuit for the solenoid 124 from the articulated steering selector switch 132, and by incorporating in this circuit a switch 141 which is closed only when the articulated steering indexer housing 91 is locked in its centered position. In the illustrated embodiment, the switch 141 is a normally closed switch to which an ear 142 is fixed. The ear 142 is disposed in the path of a trip arm 143 which is carried by the key 129. As a result, the auxiliary energization circuit is open whenever the key 129 is retracted from the keyway 128.

A final contingency for which provision is made in the interest of safety is the possibility of the operator throwing the Ackerman selector switch 126 from an "OFF" to an "ON" position while in the course of an articulated steering turn. Should the Ackerman steering lock-out mechanism 121 be de-actuated to unlock the Ackerman steering indexer housing 90 under these conditions, the stronger bias applied to the articulated steering indexer housing 91 would cause its translation from its centered position to be immediately transferred to translation of the Ackerman steering indexer housing 90. The result would be hazardously rapid straightening of the frames 11 and 12 and dangerously abrupt steering of the wheels 15 and 16. Therefore, to prevent this in the illustrated embodiment, the other blade 145 of the double pole switch 135 is connected in series with the solenoid 124 and the Ackerman steering selector switch 126. This prevents operation of the selector switch 126 to de-actuate the Ackerman steering lock-out mechanism 121. Accordingly, to de-actuate the lock-out mechanism 121, the operator must straighten the frames 11 and 12 and throw the articulated steering selector switch 132 in the "OFF" position to insert the key 129 in the keyway 128. This permits the switch 141 to close to complete the auxiliary energization circuit of the solenoid 124 to thereby de-actuate the lock-out mechanism 121. Should the frames 11 and 12 not be straight, the key 129 will land on the housing 91 and the switch 141 will be held open.

From the foregoing, it will be appreciated that the steering system provided is not limited to articulated cranes or even to articulated vehicles with any particular arrangement or number of steerable wheels.

I claim as my invention:

1. A steering system for a vehicle having first and second frames pivotally interconnected about a vertical articulated steering axis and support means for each of said frames including for one of said frames at least one pair of wheels each mounted for rotation about a respective substantially vertical steering axis, said system comprising the combination of a steering member disposed for operation by a vehicle operator, articulated steering motive means connected between said frames and actuatable for providing rotation of said wheels in either of first and second opposite directions about their respective steering axes, and control means coupled for sequentially and independently actuating said Ackerman steering motive means and said articulated steering motive means in the order mentioned in response to operation of said steering member.

2. The steering system of claim 1 wherein said control means includes a manually operable steering mode selector means connected between said steering member and said Ackerman and articulated steering motive means for enabling the operator to select any one of Ackerman steering alone, articulated steering alone, and combined Ackerman and articulated steering.

3. A steering system for a vehicle having first and second frames pivotally interconnected about a vertical articulated steering axis and support means for each of said frames including for one of said frames at least one pair of wheels each mounted for rotation about a respective substantially vertical steering axis, said system comprising the combination of a steering member disposed for operation by a vehicle operator; articulated steering means connected between said frames and actuatable for providing relative movement of said frames in either of first and second opposite directions about said articulated steering axis; Ackerman steering means connected to said wheels and actuatable for providing rotation of said wheels in either of first and second opposite directions about their respective steering axes; and control means including a variable length link, means coupled between said steering member and said link for increasing and decreasing the length of said link in response to the operation of said steering member, a first bias means, a first movable member biased to a normally centered position by said first bias means and connected to said link for movement in first and second opposite directions from its centered position in response to increases and decreases, respectively, in the length of said link, a second bias means, and a second movable member biased to a normally centered position by said second bias means and connected to said link for movement in first and second opposite directions from its centered position in response to increases and decreases, respectively, in the length of said link; said Ackerman steering means being connected to said first movable member for actuation in response to movement thereof from its centered position; and said articulated steering means being connected to said second movable member for actuation in response to movement thereof from its centered position.

4. The steering system of claim 3 wherein said second bias means is considerably stronger than said first bias means whereby said articulated steering means is actuated only after said Ackerman steering means has been fully actuated.

5. The steering system of claim 3 wherein said control means further comprises a steering mode selector means including a first lock-out mechanism actuatable for engaging and locking said first member in its centered position to thereby prevent actuation of said Ackerman steering means, a second lock-out mechanism actuatable for engaging and locking said second member in its centered position to thereby prevent actuation of said articulated steering means, and means connected to said lock-out mechanisms for preventing simultaneous actuation thereof whereby at least one steering mode is always operable.

6. The steering system of claim 5 wherein said second bias means is considerably stronger than said first bias means whereby, when said first and second lock-out mechanisms are both de-actuated for combined Ackerman and articulated steering, said articulated steering means is actuated only after said Ackerman steering means has been fully actuated.

7. A steering system for a vehicle having first and second frames pivotally interconnected about a vertical articulated steering axis and support means for each of said frames including for one of said frames at least one pair of wheels each mounted for rotation about a respective substantially vertical steering axis, said system comprising the combination of a steering member disposed for operation by a vehicle operator; articulated steering means connected between said frames and actuatable for providing relative movement of said frames in either of first and second opposite directions about said articulated steering axis; Ackerman steering means connected to said wheels and actuatable for providing rotation of said wheels in either of first and second opposite directions about their respective steering axes; and control means including a first indexer having a first axially translatable member and a first bias means tending to maintain said first member in a centered position, a second indexer having a second axially translatable member and a second bias means tending to maintain said second member in a centered position, a variable length link connected with said indexers between spaced points on one of said frames, and means coupled to said link and responsive to the operation of said steering member to increase the length of said link for a turn in one direction and decrease the length of said link for a turn in the opposite direction; said articulated steering means being coupled for actuation responsive to the displacement of one of said translatable members from its centered position; and said Ackerman steering means being coupled for actuation responsive to the displacement of the other of said translatable members from its centered position.

8. The steering system of claim 7 wherein said second bias means is considerably stronger than said first bias means whereby the actuation of said Ackerman and articulated steering means is automatically sequenced.

9. The steering system of claim 8 wherein said variable length link includes a double acting hydraulic cylinder, the means for varying the length of said link includes valve means responsive to the operation of the steering member for selectively supplying and draining pressure fluid to and from the opposite ends of said cylinder, said Ackerman steering means includes a first reversible motor connected for providing simultaneous rotation of said wheels about their respective steering axes and means responsive to the direction of displacement of said first translatable member from its centered position for actuating said first motor so that said wheels are rotated in said first direction when the length of said link is increased and in said second direction when the length of said link is decreased, and said articulated steering means includes a second reversible motor connected for providing relative movement of said frames about said articulated steering axis and means responsive to the direction of displacement of said second translatable member from its centered position for actuating said second motor so that relative movement of said frames is provided in said first direction when the length of said link is increased and in said second direction when the length of said link is decreased.

10. The steering system of claim 9 wherein said control means further comprises a steering mode selector means including an Ackerman steering lock-out mechanism actuatable for engaging and locking said first translatable member in its centered position for preventing actuation of said first motor, an articulated steering lock-out mechanism actuatable for engaging and locking said second translatable member in its centered position for preventing actuation of said second motor, and means connected to said Ackerman and articulated steering lock-out mechanisms for preventing simultaneous actuation of both.

11. The steering system of claim 10 wherein said first lock-out mechanism includes a first keyway in said first member, a first key positioned in alignment with said first keyway when said first member is in its centered position, a first control element connected to said first key, and a first switch connected with said first control element and manually positionable for selectively energizing and de-energizing said first control element to insert and withdraw said first key in and from said first keyway; and said second lock-out mechanism includes a second keyway in said second member, a second key positioned in alignment with said second keyway when said second member is in its centered position, a second control element connected to said second key, and a second switch connected with said second control element and manually positionable for selectively energizing and de-energizing said second control element ot insert and withdraw said second key in and from said second keyway.

12. The steering system of claim 11 wherein said means for preventing simultaneous actuation of said lock-out mechanisms includes bias means connected to the key of one of said lock-out mechanisms for holding said key in a withdrawn position so that the control element of said one mechanism must be energized to insert said key, means connected to said control element of said one mechanism and responsive to the actuation of the other of said mechanisms for preventing energization of said control element of said one mechanism, and means connected to the control element of said other mechanism and responsive to the actuation of said one mechanism for preventing actuation of said other mechanism.

13. The steering system of claim 7 wherein said control means further comprises a steering mode selector means and said selector means includes an Ackerman steering lock-out mechanism actuatable for locking said one translatable member in its centered position, an articulated steering lock-out mechanism actuatable for locking said other translatable member in its centered position, and fail-safe means connected to said Ackerman and articulated steering lock-out mechanisms for preventing simultaneous actuation of both.

14. The steering system of claim 13 wherein said Ackerman steering lock-out mechanism includes a first keyway in said one translatable member, a first key positioned in alignment with said first keyway when said one translatable member is in its centered position, a first control element coupled to said first key, and a first selector switch coupled to said first control element and manually operable for selectively energizing and de-energizing said first control element to insert and withdraw said first key in and from said first keyway; and said articulated steering lock-out mechanism includes a second keyway in said other translatable member, a second key positioned in alignment with said second keyway when said other translatable member is in its centered position, a second control element coupled to said second key, and a second selector switch manually operable for selectively energizing and de-energizing said second control element to insert and withdraw said second key in and from said second keyway.

References Cited

UNITED STATES PATENTS

| 2,494,324 | 1/1950 | Wright | 180—51 X |
| 2,936,038 | 5/1960 | Rockwell et al. | 180—79.2 |

FOREIGN PATENTS 650,730  10/1962  Canada.

BENJAMIN HERSH, Primary Examiner

J. A. PEKAR, Assistant Examiner